United States Patent
Walker et al.

(10) Patent No.: US 10,223,743 B2
(45) Date of Patent: Mar. 5, 2019

(54) COMMUNICATION SYSTEM PROVIDING NEAR FIELD COMMUNICATION (NFC) TRANSACTION FEATURES AND RELATED METHODS

(75) Inventors: David Ryan Walker, Waterloo (CA); Vahid Moosavi, Kitchener (CA)

(73) Assignee: BlackBerry Limited, Waterloo (CA)

( * ) Notice: Subject to any disclaimer, the term of this patent is extended or adjusted under 35 U.S.C. 154(b) by 978 days.

(21) Appl. No.: 13/074,450

(22) Filed: Mar. 29, 2011

(65) Prior Publication Data

US 2012/0254031 A1    Oct. 4, 2012

(51) Int. Cl.
| | |
|---|---|
| *G06Q 40/00* | (2012.01) |
| *G06Q 40/02* | (2012.01) |
| *G06Q 20/32* | (2012.01) |
| *G06Q 20/40* | (2012.01) |

(Continued)

(52) U.S. Cl.
CPC ......... *G06Q 40/02* (2013.01); *G06Q 20/3278* (2013.01); *G06Q 20/409* (2013.01); *G06Q 20/4014* (2013.01); *H04W 12/06* (2013.01); *H04L 63/0492* (2013.01); *H04L 63/0853* (2013.01)

(58) Field of Classification Search
CPC ............. G06K 7/0008; G06K 7/10237; G06K 19/0701; G06K 19/0704; G06Q 40/00
USPC ............................................... 705/35, 42–45
See application file for complete search history.

(56) References Cited

U.S. PATENT DOCUMENTS

| | | |
|---|---|---|
| 7,413,113 B1 | 8/2008 | Zhu .............................. 235/375 |
| 7,702,282 B2 | 4/2010 | Sandegard et al. .......... 455/41.2 |

(Continued)

FOREIGN PATENT DOCUMENTS

| | | | |
|---|---|---|---|
| EP | 1837781 | 9/2007 | ............. G06F 17/30 |
| EP | 2056246 | 5/2009 | ............. G06Q 20/00 |

(Continued)

OTHER PUBLICATIONS

"Dynamic management of multi-application secure elements" StoLPaN-NVC mobile services standards consortium.

(Continued)

*Primary Examiner* — Ojo O Oyebisi
(74) *Attorney, Agent, or Firm* — Guntin & Gust, PLC; Joseph Hrutka (57) ABSTRACT

A communication system may include a transaction terminal configured to perform a transaction based upon receiving account information, a first NFC device(s), and a mobile wireless communication device. The mobile device may include a second NFC device configured to communicate with the first NFC device(s) upon being swiped therewith, a memory configured to store account information associated with different accounts and store respective account swipe patterns for the different accounts, where each account swipe pattern comprising at least one of a set time or a set number of swipes, and a controller. The controller may be configured to detect a swipe pattern, determine whether the detected swipe pattern corresponds to one of the plurality of stored account swipe patterns, determine a respective account based upon the determined corresponding stored account swipe pattern, and communicate the associated account information for the determined respective account to the transaction terminal.

28 Claims, 5 Drawing Sheets

(51) Int. Cl.
*H04W 12/06* (2009.01)
*H04L 29/06* (2006.01)

(56) References Cited

U.S. PATENT DOCUMENTS

| | | | |
|---|---|---|---|
| 8,126,806 B1* | 2/2012 | DiMartino | G06Q 20/105 340/5.7 |
| 2003/0208439 A1* | 11/2003 | Rast | 705/38 |
| 2005/0222961 A1 | 10/2005 | Staib et al. | 705/64 |
| 2006/0073819 A1 | 4/2006 | Lowles | 455/418 |
| 2006/0079180 A1 | 4/2006 | Sinivaara | 455/41.2 |
| 2006/0148404 A1 | 7/2006 | Wakim | 455/41.2 |
| 2007/0069011 A1 | 3/2007 | Barton et al. | 235/381 |
| 2007/0095892 A1 | 5/2007 | Lyons et al. | 235/379 |
| 2007/0124503 A1 | 5/2007 | Ramos et al. | 709/248 |
| 2007/0156436 A1 | 7/2007 | Fisher et al. | 705/1 |
| 2007/0165863 A1 | 7/2007 | Moosavi | 380/283 |
| 2007/0176903 A1 | 8/2007 | Dahlin et al. | 345/169 |
| 2007/0197261 A1 | 8/2007 | Humbel | 455/558 |
| 2007/0266131 A1 | 11/2007 | Mazur et al. | 709/223 |
| 2008/0012706 A1 | 1/2008 | Mak-Fan et al. | 340/568.1 |
| 2008/0078831 A1 | 4/2008 | Johnson et al. | 235/380 |
| 2008/0014989 A1 | 6/2008 | Sandegard et al. | 455/557 |
| 2008/0191892 A1 | 8/2008 | Kirkup et al. | 340/686.6 |
| 2008/0192005 A1* | 8/2008 | Elgoyhen et al. | 345/158 |
| 2009/0037326 A1* | 2/2009 | Chitti et al. | 705/39 |
| 2009/0143104 A1 | 6/2009 | Loh et al. | |
| 2009/0192937 A1 | 7/2009 | Griffin et al. | 705/42 |
| 2009/0193500 A1* | 7/2009 | Griffin et al. | 726/2 |
| 2010/0082445 A1 | 4/2010 | Hodge et al. | 705/21 |
| 2010/0082490 A1 | 4/2010 | Rosenblatt et al. | 705/64 |
| 2010/0217707 A1 | 8/2010 | Philips | 705/41 |
| 2010/0221999 A1* | 9/2010 | Braun | H04M 1/7253 455/41.1 |
| 2011/0131104 A1 | 6/2011 | Rose et al. | |
| 2011/0282785 A1* | 11/2011 | Chin | 705/42 |
| 2012/0066126 A1* | 3/2012 | Kingston et al. | 705/44 |
| 2012/0169620 A1* | 7/2012 | Bowler, II | 345/173 |
| 2012/0193434 A1* | 8/2012 | Grigg et al. | 235/492 |
| 2012/0197740 A1* | 8/2012 | Grigg | G06Q 20/20 705/16 |

FOREIGN PATENT DOCUMENTS

| | | | |
|---|---|---|---|
| TW | 201106284 | 2/2011 | |
| WO | 2007/112787 | 11/2007 | H04B 5/02 |
| WO | 2008/069829 | 6/2008 | G06F 19/00 |
| WO | 2009/018255 | 2/2009 | H04B 1/38 |
| WO | 2009/083679 | 7/2009 | H04L 9/32 |
| WO | 2009/105115 | 8/2009 | H04W 88/04 |
| WO | 2010/128442 | 11/2010 | |

OTHER PUBLICATIONS

"NFC will make mobile payment and ticketing easier" NOKIA Press Backgrounder; Jun. 2006.
"GlobalPlatform's Proposition for NFC Mobile: Secure Element Management and Messaging" White Paper; Apr. 2009.
"GlobalPlatform's Mobile Task Force Requirements for NFC Mobile: Management of Multiple Secure Elements" Version 1.0; Public release; Feb. 2010.
U.S. Appl. No. 12/565,912, Griffin et al., filed Feb. 2, 2009.
"Apple Introduces us to a New iTunes Concert Ticket + System" http://www.patentlyapple.com/patently-apple/2010/04/apple-introduces-ustoanewitunes-concert-ticket-system.html Printed Mar. 17, 2011.
"UWave: Accelerometer-based Personalized Gesture Recognition and Its Applications" http://www.ruf.rice.edu/~mobile/publications/liu09percom.pdf Printed Mar. 17, 2011.
"Shake Well Before Use: Authentication Based on Accelerometer Data" http://docs.google.com/viewer?a=v&q=cache:Ahpq2iXVLEJ:citeseerx.ist.psu.edu/viewdoc/download%3Fdoi%3D10.1.1.76.9793%26rep%3Drep1%26type%3Dpdf+accelerometer+movement+based+network+password+authentication&hl=en&gl=ca&pid=bl&srcid=ADGEESjB65kDWWzWTIfk8nYGIv3nX900-xrCJrzPXyFyj8ETR8b6Ygpx_XksofzM1eKvPw0ESNHbq7Sv2WFvTJzMd8KVfAbJFKiaTBQkp8VKy3sgtD4iEul9VrEen1LXFOhTuC2s1FIJ&sig=AHIEtbSjqJUZN_oV7fZawnia41PTiqldW Printed Mar. 17, 2011.
"Towards a Secure Internet of Things made of RFID/NFC" http://www.comics.unina.it/index.php?option=com_content&task=view&id=226&Itemid=1: Printed Jan. 28, 2011.
"Fonelabs launches range of low-cost NFC phones" http://www.nearfieldcommunicationsworld.com/2009/03/12/3856/fonelabs-launches-range-of-low-cost-nfcphones; Printed Jan. 28, 2011.
Bump Iphone Application: http://iphone.tmcnet.com/topics/iphone/articles/55072-bump-app-exchanging-contact-info-the-iphone-one.htm Nov. 23, 2010.
Mover Iphone App: http://infinite-labs.net/mover/ Nov. 23, 2010.
U.S. Appl. No. 13/034,006, Moosavi et al., filed Feb. 24, 2011.
U.S. Appl. No. 12/955,066, DeLuca, filed Nov. 29, 2010.
Bailly et al. "White Paper. Breakthroughs in the European Mobile Payment Market" Atos Origin.
Kirovski et al. "The Martini Synch: Using Accelerometers for Device Pairing" Microsoft Research.
Jefferson et al. "The Human Chain puts NFC form factors to the test in latest White Paper" Aug. 28, 2009.
"Apple Getting Serious About Near Field Communication on the iPhone" http://www.patentlyapple.com Feb. 18, 2010: Printed Oct. 5, 2010.
"Flip n Shake light" http://uk.androlib.com/android.application.com-zosqlabs-androidflipshake-wBBB.aspx printed Feb. 22, 2010.
Rukzio et al. "Exploring Expressive NFC-Based Mobile Phone Interaction with Large Dynamic Displays Near Field Communication, 2009." NFC '09. First International Workshop: Feb. 24, 2009 pp. 36-41 Abstract: Inherent obstacles (Abstract only).
Thoughts on Nokia's NFC developments by Timo \ Published May 7, 2008 Printed Feb. 22, 2011 http://www.nearfield.org/2008/05/thoughts-on-nokias-nfc-developments.
Nokia 6131 NFC User Guide http://nds1.nokia.com/phones/files/guides/Nokia_6131_NFC_UG_en.pdf.
Timo Arnall Graphic language for touch Nov. 21, 2005 http://www.elasticspace.com/2005/11/graphic-language-for-touch.
Pering et al. "Gesture Connect: *Facilitating Tangible Interaction with a Flick of the Wrist*", 2007.
U.S. Appl. No. 13/074,423, Adams et al., filed Mar. 29, 2011.
U.S. Appl. No. 13/074,471, Carbonell Duque et al., filed Mar. 29, 2011.
U.S. Appl. No. 13/074,398, Krutt et al., filed Mar. 29, 2011.
U.S. Appl. No. 13/074,484, Adams et al., filed Mar. 29, 2011.

* cited by examiner

COMMUNICATION SYSTEM PROVIDING NEAR FIELD COMMUNICATION (NFC) TRANSACTION FEATURES AND RELATED METHODS

TECHNICAL FIELD

This application relates to the field of communications, and more particularly, to communication systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a communication system is disclosed herein which may include a transaction terminal configured to perform a transaction based upon receiving account information, at least one first near field communication (NFC) device, and a mobile wireless communication device. The mobile wireless communication device may include a second NFC device configured to communicate with the at least one first NFC device upon being swiped therewith, and a memory configured to store account information associated with a plurality of different accounts and store respective account swipe patterns for the plurality of different accounts, where each account swipe pattern comprising at least one of a set time or a set number of swipes. The mobile wireless communications device may further include a controller coupled to the memory and second NFC device and configured to detect a swipe pattern, determine whether the detected swipe pattern corresponds to one of the plurality of stored account swipe patterns, determine a respective account based upon the determined corresponding stored account swipe pattern, and communicate the associated account information for the determined respective account to the transaction terminal.

More particularly, the at least one first NFC device may have a unique identification (UID) associated therewith. As such, the controller may be further configured to receive the UID from the at least one first NFC device via the second NFC device, validate the received UID, and determine the respective account based upon validation of the UID. In addition, the plurality of different accounts may comprise payment accounts, and the at least one first NFC device may have a spending limit associated therewith. As such, the controller may be further configured to communicate payment account information for transactions below the spending limit. In some example embodiments, the plurality of different accounts may comprise security access accounts.

The at least one first NFC device may comprise a plurality of first NFC devices each associated with a different respective payment account category. By way of example, the different account categories may correspond to personal or business payment account categories. Also by way of example, the payment account categories may correspond to different credit card types. Furthermore, the set number of swipes may comprise a plurality of swipes.

The transaction terminal may be further configured to communicate via NFC, and the controller may be configured to communicate the respective account information for the selected account to the transaction terminal via the second NFC device. Additionally, the at least one first NFC device may comprise at least one passive NFC device.

A related mobile wireless communication device, such as the one described briefly above, and a related communication method are also provided. The method may include storing respective account information for a plurality of different accounts in a memory of a mobile wireless communications device, and storing respective account swipe patterns for the plurality of different accounts in the memory, where each account swipe pattern comprises at least one of a set time or a set number of swipes. The method may further include causing the mobile wireless communication device to communicate with at least one near field communication (NFC) device based upon swiping therewith and determining, at the mobile wireless communications device, an actual swipe pattern with the at least one NFC device based upon the NFC communications. The method may also include determining, at the mobile wireless communications device, a matching account swipe pattern between the actual swipe pattern and the plurality of stored account swipe patterns, as well as determining, at the mobile wireless communications device, a respective account based upon the matching account swipe pattern. Also, the method may include communicating the respective account information from the mobile wireless communications device to a transaction terminal.

A related non-transitory computer-readable medium may have computer-executable instructions for causing a mobile wireless communications device to perform steps including storing respective account information for a plurality of different accounts in a memory of the mobile wireless communications device, and storing respective account swipe patterns for the plurality of different accounts in the memory, where each account swipe pattern comprising at least one of a set time or a set number of swipes. The steps may further include communicating with at least one NFC device based upon swiping therewith, determining an actual swipe pattern with the at least one NFC device based upon the NFC communications, determining a matching account swipe pattern between the actual swipe pattern and the plurality of stored account swipe patterns, determining a respective account based upon the matching account swipe pattern, and communicating the respective account information to the transaction terminal.

Referring initially to FIGS. 1 through 6, a communication system 30 and related method aspects are first described. Generally speaking, the system 30 advantageously implements near field communication (NFC) functionality to facilitate transactions, such as financial or security transactions, for example. By way of background, NFC is a short-range wireless communications technology in which NFC-enabled devices are "swiped," "bumped" or otherwise moved in close proximity to communicate. In a non-limiting example implementation, NFC may operate at 13.56 MHz and with an effective range of about 10 cm, but other suitable versions of near-field communication which may have different operating frequencies, effective ranges, etc., for example, may also be used.

Figure 1:
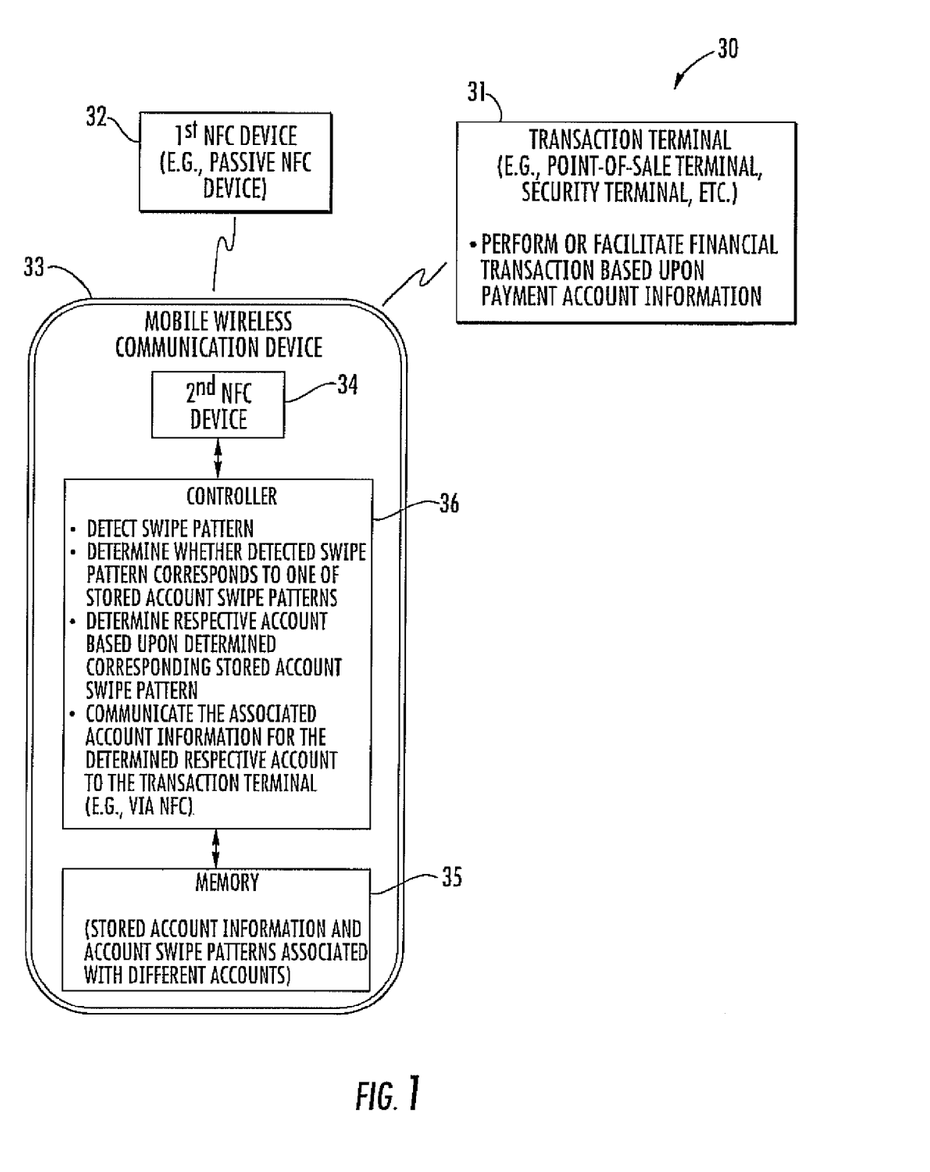
FIG. 1 is a schematic block diagram of a communication system in accordance with an example embodiment.

Some legacy NFC hardware may prevent mobile wireless communication devices (also referred to as "mobile devices" herein) with NFC capabilities from automatically providing the appropriate account, program or protocol during transactions. For example, if multiple payment options, loyalty cards, transit passes, secure access badges, etc., are available for use on a given NFC-enabled mobile device, there may be no way of automatically selecting the appropriate protocol, payment account (e.g., a credit card account), etc. Instead, the user may be required to manually select an intended program, protocol or payment account before swiping, which in many use cases is not a preferable interaction. The system 30 may advantageously be used to help streamline the process of selecting the appropriate account, program or protocol for a desired transaction through the use of NFC.

More particularly, the system 30 illustratively includes a transaction terminal 31 configured to perform a transaction (e.g., a financial transaction, permit entry to a secure area, etc.) based upon receiving account information, at least one or more near field communication (NFC) devices 32, and a mobile device 33. Example mobile devices 33 may include portable or personal media players (e.g., MP3 players, video players, etc.), remote controls (e.g., television or stereo remotes, vehicle remotes, etc.), portable gaming devices, portable or mobile telephones, smartphones, tablet computers, electronic readers (e-readers), etc. By way of example, the first NFC device 32 may be a passive NFC device (e.g., a NFC tag), and may include a NFC transceiver and a memory for storing data. The mobile device 33 illustratively includes a second NFC device 34 that may comprise an active NFC device which provides a field for powering the first NFC device 32 and communicating therewith. However, the first NFC device 32 may be active, and the second NFC device 34 may be passive, in some embodiments.

The second NFC device 34 is configured to communicate with the first NFC device 32 upon being swiped therewith (which may involve physical contact in some embodiments, or may only involve the first and second NFC devices coming within NFC communication range of one another with or without physical contact in other embodiments). The mobile device 33 further illustratively includes a memory 35 and a controller 36 coupled to the second NFC device 34 and the memory 35. The controller 36 may be implemented using a combination of hardware (e.g., microprocessor, memory, etc.) and software components, such as a non-transitory computer-readable medium having computer-executable instructions for performing the operations described herein.

Figure 2:
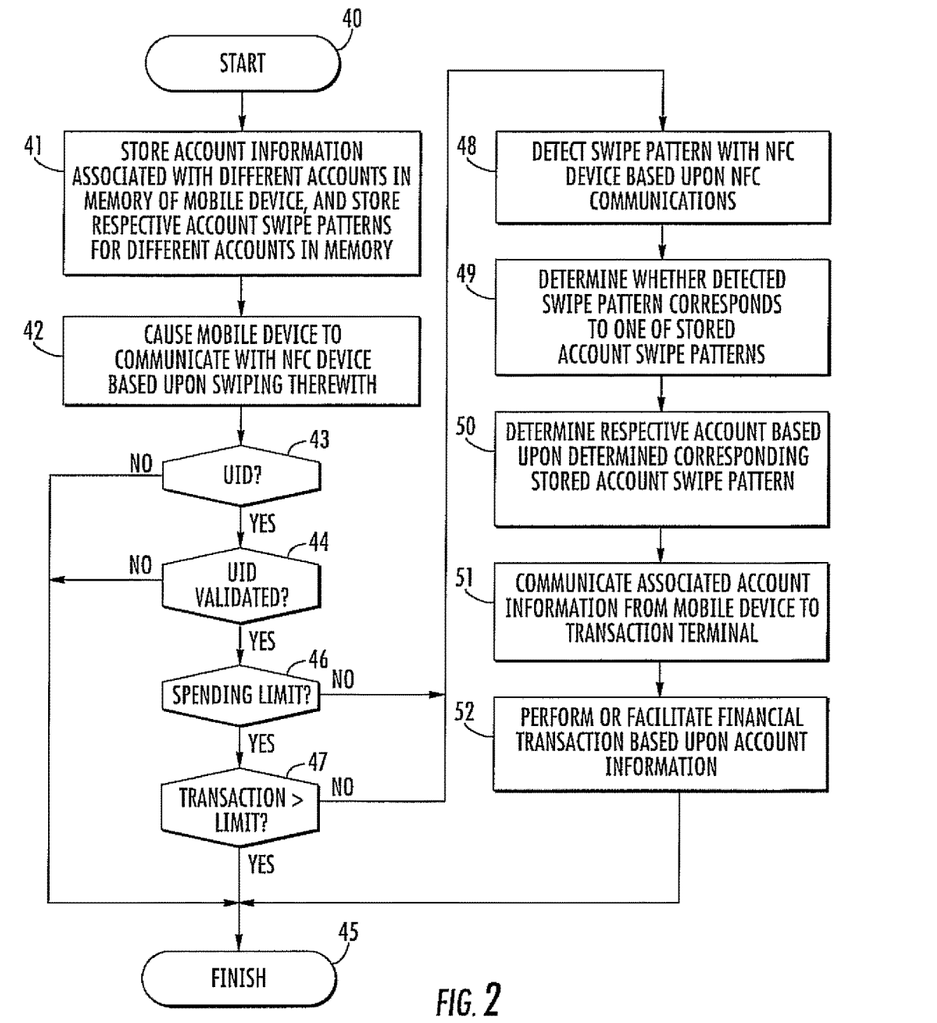
FIG. 2 is a flow diagram illustrating method aspects associated with the system of FIG. 1.

Beginning at Block 40, the memory 35 is configured to store account information associated with a plurality of different accounts, and store respective account swipe patterns for the plurality of different accounts, at Block 41. In particular, each account swipe pattern may comprise at least one of the following: a set time and a set number of swipes. That is, the duration of a swipe (e.g., how long the first and second NFC devices 32, 34 remain in NFC communication range), as well as the number of swipes between the first and second NFC devices, may be used to readily select an appropriate account for a given transaction.

When the first NFC device 32 and the mobile device 33 (i.e., the second NFC device 34) are swiped or bumped together, which causes the first NFC device 32 and the second NFC device 34 to communicate with one another (Block 42), the controller 36 may retrieve data stored by the first NFC device 32. Generally speaking, the first NFC device 32 stores data that indicates a particular type or category of account to the controller 36, so that upon swiping of the first NFC device the controller may make an appropriate determination as to which of a plurality of different accounts that it is configured to use for a transaction. By way of example, the different accounts may relate to different bank or credit accounts (e.g., credit card accounts) for financial transactions, different security accounts (e.g., different security badges) for different locations, different reward programs, gift cards, etc.

In some implementations, the first NFC device 32 may be a public device located in a public area, such as near a point-of-sale (POS) terminal, in a public transportation station (e.g., bus, train, subway, taxi, airport, etc.), or near a security checkpoint (e.g., a building entrance, an arena, etc.). In this way, various NFC-enabled mobile devices 33 may swipe the first NFC device 32 for a set time or in a set pattern to select a desired account type for an ensuing transaction with the transaction terminal 31. For example, the first NFC device 32 may store a universal identification (ID), which indicates to the controller 36 a certain type or category of credit card (e.g., MasterCard, etc.) to be used, or simply credit cards in general. The universal ID may also generally indicate that a security account is to be selected or enabled in some example embodiments.

In other example implementations, the first NFC device 32 may be a private device associated with a respective user or mobile device 33. In such case, a unique identification (UID) may be associated with the first NFC device 32, and the controller 36 may be further configured to receive the UID from the first NFC device 32 via the second NFC device 34 and validate the received UID, at Blocks 43-44. That is, the controller 36 may be configured to perform account selection and perform a given transaction upon validation that the first NFC device 32 is indeed the device that is paired with the mobile device 33. If the UID is not validated, then the controller 36 may terminate the transaction process, at Block 45. In some example embodiments, the UID may also be associated with a specific account, such as to indicate that a given credit card account should be used as a default unless otherwise changed, for example.

Other data that may be associated with the first NFC device 32 may include a spending limit for financial transactions, for example. If a spending limit is communicated from the first NFC device 32, the controller 36 may verify that the desired financial transaction cost does not exceed the transaction limit, at Blocks 46-47. If it does, the controller 36 may terminate the transaction process. That is, the controller 36 may be configured to communicate account information to the transaction terminal 31 only for transactions below the spending limit. This particular feature may be advantageous where private NFC devices 32 (e.g., NFC tags) are given to children, allowing parents to limit an amount that the children may spend on various transactions, for example.

The controller 36 is further configured to determine or detect an actual swipe pattern with the first NFC device 32, at Block 48. As noted above, this may include a time or duration that the first and second NFC device 32, 33 remain within NFC communication range, and/or a number of times that the first and second NFC devices are swiped together. The controller 36 may also determine whether the detected swipe pattern corresponds to one of the plurality of stored account swipe patterns in the memory 35, at Block 49, determine a respective account based upon the determined corresponding stored account swipe pattern, at Block 50, and communicate the associated account information for the determined respective account to the transaction terminal 31, at Block 51. This may be done via NFC communication with the transaction terminal 31, or in some applications via another wireless communications format (e.g., Bluetooth, WiFi, cellular, etc.) As noted above, the transaction terminal 31 may then perform the desired transaction using the respective account, at Block 52, which may thereby help simplify or expedite the transaction process.

Figure 3:
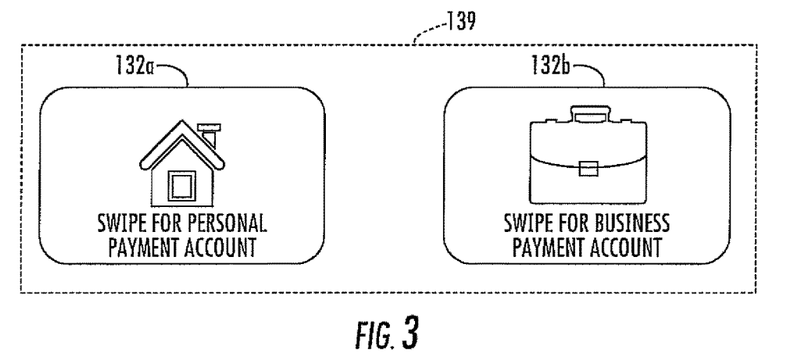
FIGS. 3 and 4 are schematic block diagrams illustrating example NFC device configurations for use with the system of FIG. 1.
Figure 5:
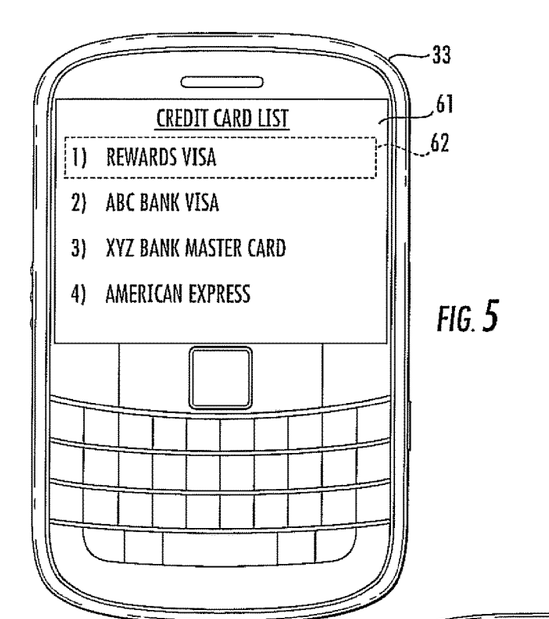
FIGS. 5 and 6 are front views of an example implementation of the mobile wireless communications device of the system of FIG. 1 illustrating account selection in accordance with example embodiments.
Figure 6:
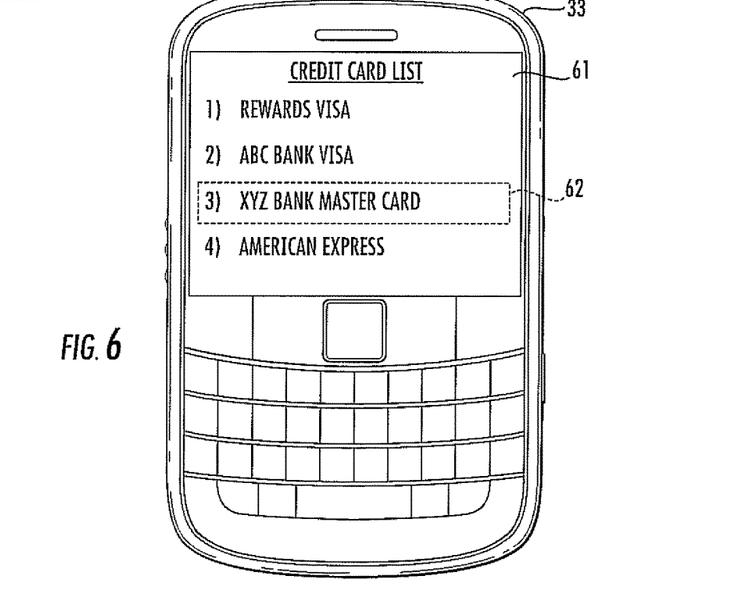

In the example of FIG. 3, a plurality of first NFC devices 132a, 132b (here, passive NFC tags) are located in an area 139, which may be next to a POS terminal (such as upstream from the POS terminal in a checkout line) which relate to personal or business payment account categories. More particularly, the NFC tag 132a is a general or public NFC tag that corresponds to a personal payment account (as indicated by a home or house icon), and the NFC tag 132b is a general or public NFC tag that corresponds to a business payment account (indicated by a briefcase icon). Assuming for the present example that the personal payment NFC device 132a is swiped, the controller 36 then knows to select from among the configured personal payment credit card accounts, which in the examples of FIGS. 5-6 are four personal credit card accounts, namely (1) "Rewards VISA", (2) "ABC Bank VISA", (3) "XYZ Bank MasterCard", and (4) "American Express". These accounts may be ordered or listed in various ways, such as by user selection, or in the order the cards were added to or configured on the mobile device 33, for example.

In the example of FIG. 5, the "Rewards VISA" may be considered the default personal credit card account used for financial transactions since it is the first listed on a display 61, as indicated by a dashed highlight box 62. By holding the second NFC device 34 within NFC communication range of the NFC tag 132a for a set time, the user may advantageously scroll or advance through the list of credit card accounts to select a different account. For example, for every one-second period that the NFC tag 132a and the second NFC device 34 are in NFC communication range, the controller 36 may move to a next credit card in the list. So, as seen in FIG. 6, the NFC tag 132a and the second NFC device 34 are in NFC range for three seconds, because the controller 36 has advanced to the third card in the list (i.e., the XYZ Bank MasterCard). Removing the second NFC device from communication range of the NFC tag 132a may select the XYZ Bank MasterCard. However, other periods of time beside one-second intervals may also be used in different embodiments. In another example embodiment, the mobile device 34 may be swiped with the NFC tag 132a three times in a row (i.e., brought in-and-out of NFC communication range three times) to achieve the same result. In still further example embodiments, a combination of duration and number of swipes may be used for account determination.

Figure 4:
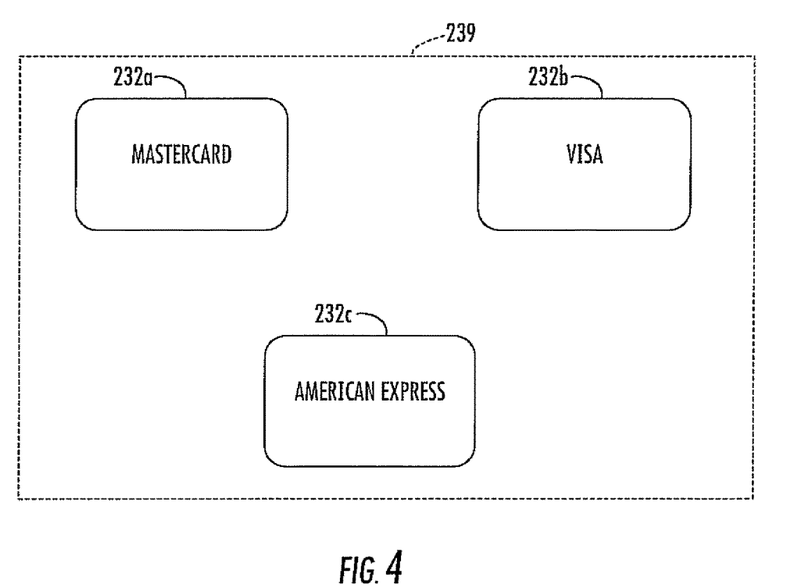

In the example of FIG. 4, a plurality of NFC tags 232a, 232b, and 232c are positioned in an area 239, which may be the area adjacent a POS terminal. Here, the NFC tags 232a-232c correspond to different credit card types, namely MasterCard, VISA, and American Express, respectively. Thus, using the prior example, if the VISA NFC tag 232b is swiped twice (or the mobile device 33 is held in NFC communication range with the VISA NFC tag 232b for two seconds), then the ABC Bank VISA card may be selected rather than the Rewards VISA card.

The system 30 may therefore advantageously utilize one or more NFC devices 32 to place a mobile device into an appropriate mode for a subsequent transaction prior to communicating with a NFC-enabled transaction terminal 31 (although the transaction terminal may be swiped first in some embodiments). This may advantageously allow the second NFC device 34 to remain in a tag reader/writer mode (i.e., requiring relatively low power usage), and also allowing the second NFC device to read/write passive tags (e.g., smart posters, paint with accessories, location based docs, etc.) automatically without user interface interaction. Then, when an instance occurs where the second NFC device 34 should be in tag emulation mode, a first NFC device 32 corresponding to an appropriate program, protocol, category, etc., may be swiped, placing the second NFC device into a corresponding tag emulation mode.

In accordance with an example financial transaction use case, when it is desired to make a payment at a POS terminal, several NFC tags corresponding to various payment options, reward or loyalty accounts, etc., available at that location. Then, when a NFC tag corresponding to a given card, etc. is swiped, a corresponding image may appear on a display of the device, so that the user is informed which credit card account should be used for the transaction upon swiping the POS terminal. Swiping the passive tags corresponding to each account may temporarily place the mobile device into a tag emulation mode, and set to the corresponding account and associated program (e.g., a VISA payment application, etc.), as well as an appropriate protocol (e.g., NFC type A, B, F, etc.) for the transaction. This may advantageously reduce the need for a user to launch specific applications and choose specific options each time he or she wants to make a purchase, thus speeding up the transaction.

In accordance with another example use case, a mobile device may be used in tag emulation mode for access control. More particularly, it may be cumbersome for a user to manually select an access control mode on his or her mobile device every time entry to a secure location is desired. Instead, a passive tag may be located at each access terminal, allowing a mobile device to first swipe the tag, automatically placing the mobile device into access control mode based upon the data stored on the NFC tag, and then swipe the access terminal to gain access. Again, multiple swipes or set times may be used to select different security badge or account credentials, for example. The passive tag may also be a private NFC tag that a user carries with him (e.g., on a holster, in a watch, wallet, etc.), so that the user may first tap the NFC tag and then the access terminal, rather than selecting the appropriate mode through an on screen menu, etc.

Example components of a mobile wireless communications device 1000 that may be used in accordance with the above-described embodiments are further described below with reference to FIG. 7. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 7:
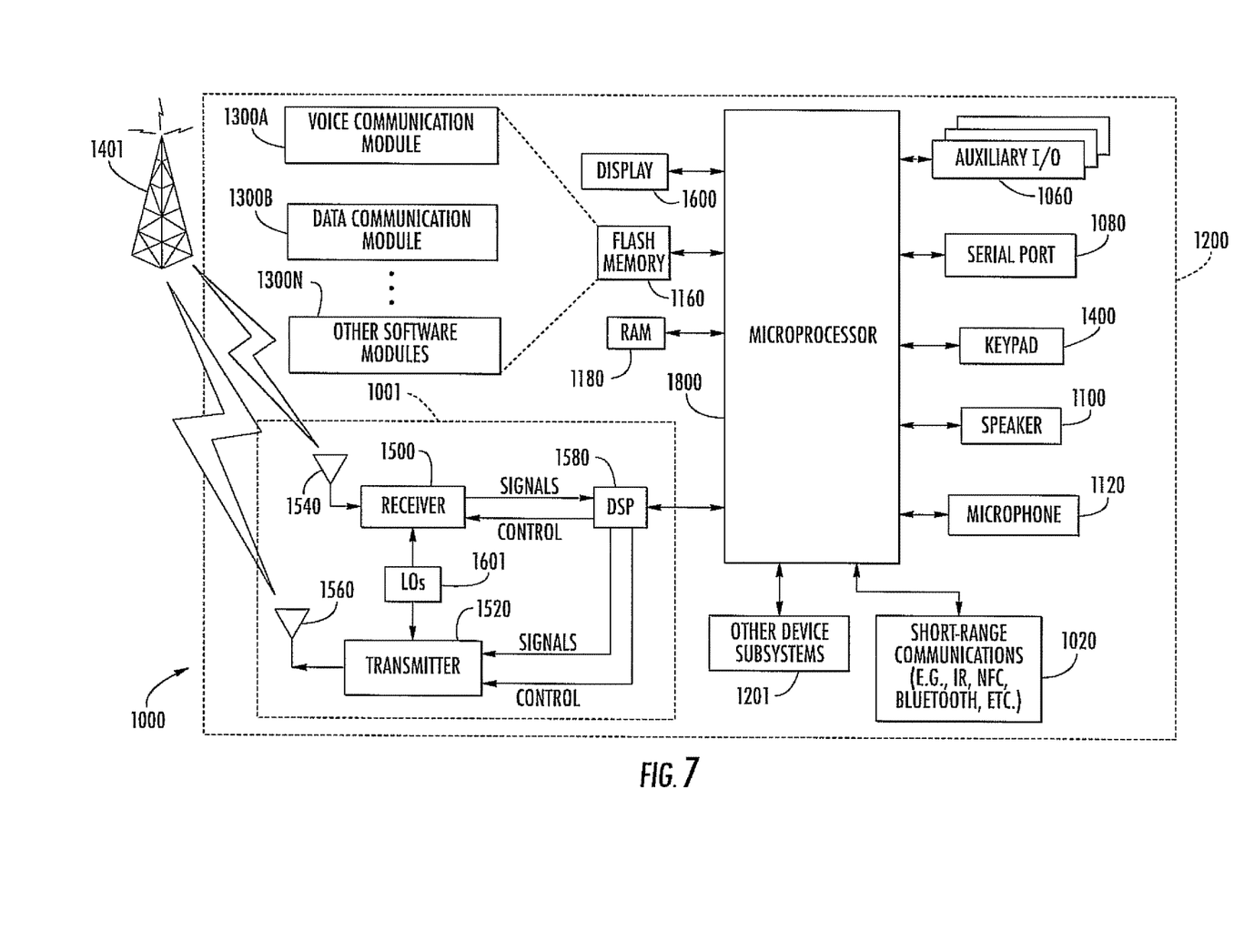
FIG. 7 is a schematic block diagram illustrating example components of a mobile wireless communications device that may be used with the device of FIG. 1.

In addition to the processing device 1800, other parts of the mobile device 1000 are shown schematically in FIG. 7. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A communication system, comprising:
   a transaction terminal configured to perform a transaction based upon receiving account information;
   at least one first near field communication (NFC) device; and
   a mobile wireless communication device comprising:
      a display,
      a second NFC device configured to communicate with said at least one first NFC device upon being swiped therewith,
      a memory that stores instructions and account information associated with a plurality of different accounts, and stores respective account swipe patterns for the plurality of different accounts wherein each of the account swipe patterns corresponds to a respective stored account, each account swipe pattern comprising a set time that the first and second NFC devices remain in NFC communications range, wherein a predetermined time that the first and second NFC devices remain in NFC communications range within the set time corresponds to a predetermined account credential and a specific stored account for a financial transaction, and
      a controller coupled with said memory, display and second NFC device, the controller, responsive to executing the instructions, performing operations comprising:
         detecting a performed swipe pattern, wherein the detecting comprises detecting a duration that the first NFC device and the second NFC device remain within NFC communications range and detecting a number of times that the first NFC device and the second NFC device are swiped together,
         determining whether the performed swipe pattern corresponds to one of the plurality of stored account swipe patterns,
         selecting a respective account from among the plurality of different accounts according to the predetermined time that the first and second NFC devices remain in the NFC communications range within the set time corresponding to the predetermined account credential and the specific stored account for the financial transaction, wherein the selecting of the respective account comprises monitoring for a pre-defined time period to pass and monitoring for the number of times that the first NFC device and the second NFC device are swiped together successively, and switching to a different account of the plurality of different accounts responsive to a passage of each pre-defined time period or to each successive time that the first NFC device and the second NFC device are swiped together,
         presenting, at the display, account identification information representing the selecting of the respective account of the plurality of different accounts during the switching that is responsive to the passage of each pre-defined time period,
         communicating associated account information for the respective account to said transaction terminal to perform the financial transaction, and
         placing the second NFC device in a first mode responsive to the first NFC device and the second NFC device being swiped together, the second NFC device being in a second mode prior to the first NFC device and the second NFC device being swiped together, the financial transaction accordingly being performed while the second NFC is in the first mode, wherein a first power usage of the second NFC device is greater in the first mode than a second power usage of the second NFC device in the second mode.

2. The communication system of claim 1, wherein said at least one first NFC device has a unique identification (UID) associated therewith, and wherein said controller is further configured to perform operations comprising:
   receiving the UID from said at least one first NFC device via said second NFC device as a received UID;
   validating the received UID; and
   determining the respective account based upon a validation of the received UID.

3. The communication system of claim 1, wherein the plurality of different accounts comprises a plurality of different payment accounts, wherein said at least one first NFC device has a spending limit associated therewith, and wherein said controller is further configured to communicate payment account information for transactions below the spending limit.

4. The communication system of claim 1, wherein the plurality of different accounts comprises a plurality of different payment accounts, and wherein said at least one first NFC device comprises a plurality of first NFC devices each associated with a different respective payment account category.

5. The communication system of claim 4, wherein the different payment account categories correspond to personal or business payment account categories.

6. The communication system of claim 4, wherein the different payment account categories correspond to different credit card types.

7. The communication system of claim 1, wherein the switching further comprises monitoring for the number of times that the first NFC device and the second NFC device are swiped together successively according to a predetermined number of swipes before performing the switching.

8. The communication system of claim 1, wherein the plurality of different accounts comprises a plurality of different security access accounts.

9. The communication system of claim 1, wherein said transaction terminal is further configured to communicate via NFC, and wherein said controller is configured to communicate the associated account information for the respective account to said transaction terminal via said second NFC device.

10. The communication system of claim 1, wherein said at least one first NFC device comprises at least one passive NFC device.

11. A mobile wireless communication device for use with a transaction terminal that performs a transaction based upon receiving account information and at least one first near field communication (NFC) device, the mobile wireless communications device comprising:
 a display;
 a second NFC device that communicates with the at least one first NFC device upon being swiped therewith;
 a memory that stores instructions and account information associated with a plurality of different accounts, and that stores respective account swipe patterns for the plurality of different accounts wherein each of the account swipe patterns corresponds to a respective stored account, each account swipe pattern comprising a set time that the first and second NFC devices remain in NFC communications range wherein a predetermined time that the first and second NFC devices remain in NFC communications range within a set time corresponds to a predetermined account credential and a specific stored account for a financial transaction; and
 a controller coupled with said memory, display and second NFC device, the controller, responsive to executing the instructions, performing operations comprising:
  detecting a performed swipe pattern, wherein the detecting comprises detecting a duration that the first NFC device and the second NFC device remain within NFC communications range and detecting a number of times that the first NFC device and the second NFC device are swiped together;
  determining whether the performed swipe pattern corresponds to one of the plurality of stored account swipe patterns;
  selecting a respective account from among the plurality of different accounts according to the predetermined time that the first and second NFC devices remain in the NFC communications range within the set time corresponding to the predetermined account credential and the specific stored account for the financial transaction, wherein the selecting of the respective account comprises monitoring for a pre-defined time period to pass and monitoring for the number of times that the first NFC device and the second NFC device are swiped together successively and switching to a different account of the plurality of different accounts responsive to a passage of each pre-defined time period;
  presenting, at the display, account identification information representing the selecting of the respective account of the plurality of different accounts during the switching that is responsive to the passage of each pre-defined time period;
  communicating associated account information for the respective account to the transaction terminal to perform the financial transaction; and
  placing the second NFC device in a first mode responsive to the first NFC device and the second NFC device being swiped together, the second NFC device being in a second mode prior to the first NFC device and the second NFC device being swiped together, the financial transaction accordingly being performed while the second NFC is in the first mode, wherein a first power usage of the second NFC device is greater in the first mode than a second power usage of the second NFC device in the second mode.

12. The mobile wireless communication device of claim 11, wherein the at least one first NFC device has a unique identification (UID) associated therewith, and wherein said controller is further configured to perform operations comprising:
 receiving the UID from the at least one first NFC device via said second NFC device as a received UID;
 validating the received UID; and
 determining the respective account based upon validation of the received UID.

13. The mobile wireless communication device of claim 11, wherein the plurality of different accounts comprises a plurality of different payment accounts, wherein said at least one first NFC device has a spending limit associated therewith, and wherein said controller is further configured to communicate payment account information for transactions below the spending limit.

14. The mobile wireless communication device of claim 11, wherein the plurality of different accounts comprises a plurality of different payment accounts, wherein the at least one first NFC device comprises a plurality of first NFC devices each associated with a different respective payment account category, and wherein the different payment account categories correspond to personal or business payment account categories.

15. The mobile wireless communication device of claim 11, wherein the plurality of different accounts comprises a plurality of different payment accounts, wherein the at least one first NFC device comprises a plurality of first NFC devices each associated with a different respective payment account category, and wherein the different payment account categories correspond to different credit card types.

16. The mobile wireless communication device of claim 11, wherein the transaction terminal is further configured to communicate via NFC, and wherein said controller is configured to communicate the associated account information for the respective account to said transaction terminal via said second NFC device.

17. A communication method comprising:
 storing account information associated with a plurality of different accounts in a memory of a mobile wireless communications device, and storing respective account swipe patterns for the plurality of different accounts in the memory wherein each of the account swipe patterns corresponds to a respective stored account, each account swipe pattern comprising a set time that a first NFC device and a second NFC device remain in NFC communications range wherein a predetermined time that the first and second NFC devices remain in NFC communications range within a set time corresponds to a predetermined account credential and a specific stored account for a financial transaction;
 causing the mobile wireless communication device to communicate with at least one near field communication (NFC) device based upon swiping therewith;

detecting, at the mobile wireless communications device, a performed swipe pattern with the at least one NFC device based upon the NFC communications, wherein the detecting comprises detecting a duration that the first NFC device and the second NFC device remain within NFC communications range and detecting a number of times that the first NFC device and the second NFC device are swiped together;

determining, at the mobile wireless communications device, whether the performed swipe pattern corresponds to one of the plurality of stored account swipe patterns;

selecting, at the mobile wireless communications device, a respective account from among the plurality of different accounts according to the predetermined time that the first and second NFC devices remain in the NFC communications range within the set time corresponding to the predetermined account credential and the specific stored account for the financial transaction, wherein the selecting of the respective account comprises monitoring for a pre-defined time period to pass and monitoring for the number of times that the first NFC device and the second NFC device are swiped together successively, and switching to a different account of the plurality of different accounts responsive to a passage of each pre-defined time period;

presenting, at a display of the mobile wireless communications device, account identification information representing the selecting of the respective account of the plurality of different accounts during the switching that is responsive to the passage of each pre-defined time period;

communicating associated account information for the respective account from the mobile wireless communications device to a transaction terminal to perform the financial transaction; and placing the second NFC device in a first mode responsive to the first NFC device and the second NFC device being swiped together, the second NFC device being in a second mode prior to the first NFC device and the second NFC device being swiped together, the financial transaction accordingly being performed while the second NFC is in the first mode, wherein a first power usage of the second NFC device is greater in the first mode than a second power usage of the second NFC device in the second mode.

18. The method of claim 17, further comprising facilitating a transaction with the transaction terminal based upon the account information.

19. The method of claim 17, wherein the at least one NFC device has a unique identification (UID) associated therewith, and wherein the method further comprises communicating the UID from the at least one NFC device to the mobile wireless communication device and validating the UID at the mobile wireless communications device, and wherein the determining the respective account further comprises determining the respective account based upon a validation of the UID.

20. The method of claim 17, wherein the plurality of different accounts comprises a plurality of different payment accounts, wherein the at least one NFC device has a spending limit associated therewith, and wherein communicating further comprises communicating payment account information for transactions below the spending limit.

21. The method of claim 17, wherein the plurality of different accounts comprises a plurality of different payment accounts, wherein the at least one NFC device comprises a plurality of NFC devices each associated with a different respective payment account category, and wherein the different payment account categories correspond to personal or business payment account categories.

22. The method of claim 17, wherein the plurality of different accounts comprises a plurality of different payment accounts, wherein the at least one NFC device comprises a plurality of NFC devices each associated with a different respective payment account category, and wherein the different payment account categories correspond to different credit card types.

23. The method of claim 17, wherein the communicating the associated account information comprises communicating the associated account information from the mobile wireless communications device to the transaction terminal via NFC.

24. A non-transitory, machine-readable storage medium, comprising executable instructions that, when executed by a processing system of a mobile wireless communications device including a processor, facilitate performance of operations, comprising:

storing account information associated with a plurality of different accounts in a memory of the mobile wireless communications device, and storing respective account swipe patterns for the plurality of different accounts in the memory wherein each of the account swipe patterns corresponds to a respective stored account, each account swipe pattern comprising a set time that a first NFC device and a second NFC device remain in NFC communications range wherein a predetermined time that the first and second NFC devices remain in NFC communications range within a set time corresponds to a predetermined account credential and a specific stored account for a financial transaction;

communicating with at least one near field communication (NFC) device based upon swiping therewith;

detecting a performed swipe pattern with the at least one NFC device based upon the NFC communications, wherein the detecting comprises detecting a duration that the first NFC device and the second NFC device remain within NFC communications range and detecting a number of times that the first NFC device and the second NFC device are swiped together;

determining whether the performed swipe pattern corresponds to one of the plurality of stored account swipe patterns;

selecting a respective account from among the plurality of different accounts according to the predetermined time that the first and second NFC devices remain in the NFC communications range within the set time corresponding to the predetermined account credential and the specific stored account for the financial transaction, wherein the selecting of the respective account comprises monitoring for a pre-defined time period to pass and monitoring for the number of times that the first NFC device and the second NFC device are swiped together successively, and switching to a different account of the plurality of different accounts responsive to a passage of each pre-defined time period;

presenting, at a display of a mobile wireless communications device, account identification information representing the selecting of the respective account of the plurality of different accounts during the switching that is responsive to the passage of each pre-defined time period;

communicating associated account information for the respective account to a transaction terminal to perform the financial transaction, selecting a first mode for the second NFC device responsive to the first NFC device and the second NFC device being swiped together; and selecting a second mode for the second NFC device responsive to the first NFC device and the second NFC device not being swiped together, wherein the financial transaction accordingly is performed while the second NFC is in the first mode, and wherein a first power usage of the second NFC device is greater in the first mode than a second power usage of the second NFC device in the second mode.

25. The non-transitory, machine-readable medium of claim 24, wherein the at least one NFC device has a unique identification (UID) associated therewith, wherein the operations further comprise receiving the UID from the at least one first NFC device as a received UID and validating the received UID, and wherein the determining the respective account further comprises determining the respective account based upon a validation of the received UID.

26. The non-transitory, machine-readable medium of claim 24, wherein the plurality of different accounts comprises a plurality of different payment accounts, wherein the at least one NFC device has a spending limit associated therewith, and wherein the communicating further comprises communicating payment account information for transactions below the spending limit.

27. The non-transitory, machine-readable medium of claim 24, wherein the plurality of different accounts comprises a plurality of different payment accounts, wherein the at least one NFC device comprises a plurality of NFC devices each associated with a different respective payment account category, and wherein the different payment account categories correspond to personal or business payment account categories.

28. The non-transitory, machine-readable medium of claim 24, wherein the plurality of different accounts comprises a plurality of different payment accounts, wherein the at least one NFC device comprises a plurality of NFC devices each associated with a different respective payment account category, wherein the different payment account categories correspond to different credit card types.

* * * * *